May 4, 1926.
W. B. WALLACE
TRACTION DEVICE
Filed August 25, 1925
1,583,209
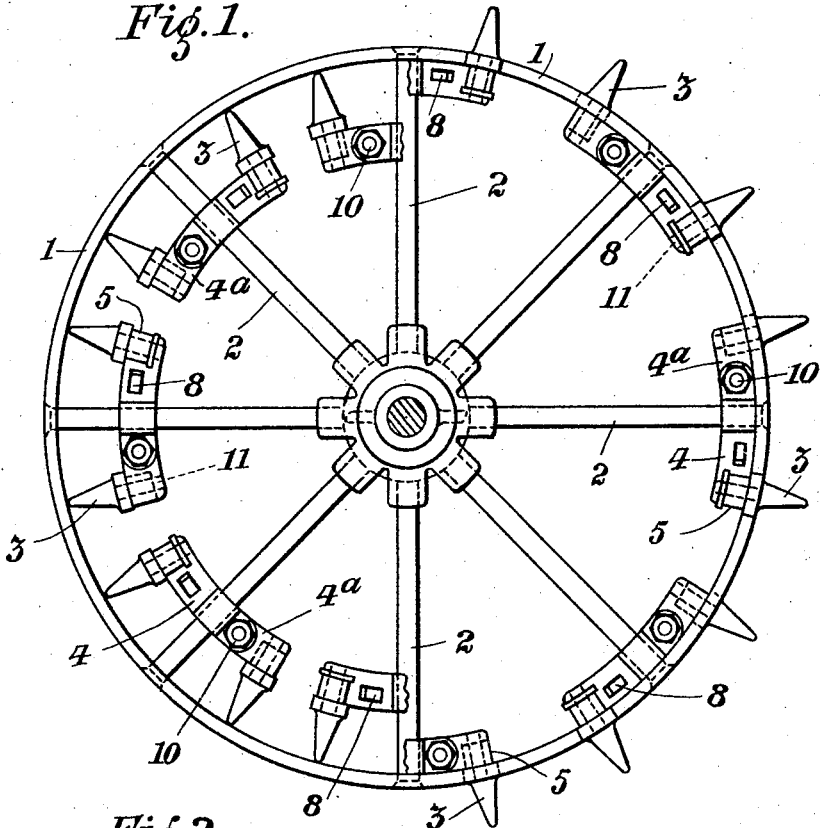
Fig.1.
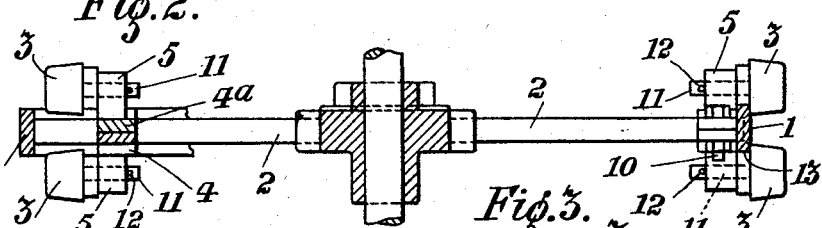
Fig.2.
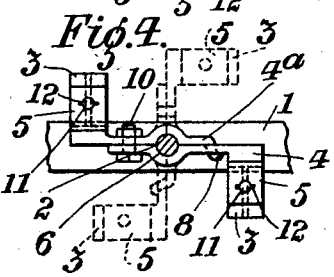
Fig.4.
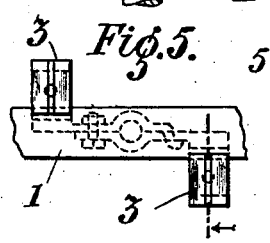
Fig.5.
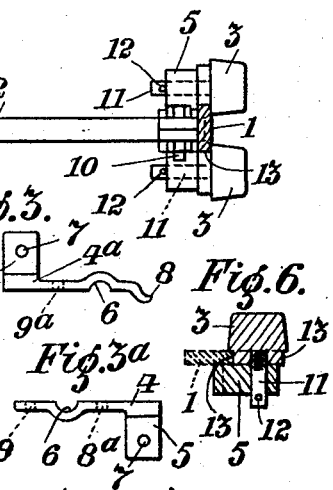
Fig.3.
Fig.3a.
Fig.6.
William Burns Wallace
John B. Brady.
Attorney Patented May 4, 1926.

1,583,209

UNITED STATES PATENT OFFICE.

WILLIAM BURNS WALLACE, OF GLASGOW, SCOTLAND, ASSIGNOR TO JOHN WALLACE AND SONS, LIMITED, OF GLASGOW, SCOTLAND.

TRACTION DEVICE.

Application filed August 25, 1925. Serial No. 52,338.

*To all whom it may concern:*

Be it known that I, WILLIAM BURNS WALLACE, of 34 Paton Street, Glasgow, Scotland, a subject of the King of Great Britain, have invented certain new and useful Improvements in or Relating to Traction Devices, of which the following is a specification.

This invention relates to a spud arrangement for the wheels of agricultural implements, tractors and the like. As a rule the implements or tractors have wheels with metal rims and the spuds are provided to prevent the wheels slipping when the implement or tractor is employed on ground having a loose or soft surface.

The spuds are usually cast on or riveted or bolted to the metallic rim of the wheel. It is, however, common practice to make the spuds detachable from the rim so that they can be separately and entirely removed when the tractor or other vehicle is required to pass over firm ground, such as roads. The detachable spuds are usually screwed or bolted in place and holes have to be made in the rim for the reception of the screws or bolts. In some cases the spuds are adapted to be moved inwards and outwards through holes in the rim.

The object of the present invention is to mount the spuds upon the wheels in such a manner that the necessity for making holes in the rim is avoided as well as the necessity for using rivets the spuds being movable quickly out of their operative position upon the rim to the inside of the wheel so that the implement or tractor can run on a hard surface, this being effected without detaching the spuds from the wheel.

According to this invention a spud arrangement for the wheels of agricultural implements, tractors, and the like in which the spuds can be moved inside the rim when so desired, has the characteristic feature that the spuds are given a radial movement to bring them to the outside of the rim and also a partial turning movement so as to interlock them with the opposite sides of the rim. No holes are required to be made in the rim and when the spuds are interlocked with the rim they are securely held and supported by the latter. The spuds are carried by the wheel spokes or their equivalent.

A further feature of the invention consists in the arrangement of the spuds in pairs, the spuds of each pair being each provided with a bracket and the brackets being adapted to interlock and also to be clamped around the spoke (or equivalent) of the wheel. Thus when desired, the whole device can be moved radially into or out of its operative position or be clamped firmly to the spoke or equivalent. The clamping is preferably effected by a simple bolt.

In order that the invention may be more clearly understood, a preferred form thereof will now be described by way of example and with reference to the annexed drawing, whereon:—

Fig. 1 is an elevation of a wheel provided with spuds made in accordance with this invention, the spuds on one half of the wheel being shown in operative position and those on the other half in inoperative position.

Fig. 2 is a diametric section of the same.

Fig. 3 shows one of a pair of spud attaching brackets.

Fig. 3ª shows the other of the pair.

Fig. 4 shows (looking at the inside of the wheel rim) a pair of spuds and brackets in position on a spoke, the broken lines indicating the position into which the spuds and brackets have to be turned to allow them to clear the rim of the wheel in passing from the inoperative to the operative position, or vice versa.

Fig. 5 shows a pair of spuds and associated brackets in operative position and looking from outside the rim, and, Fig. 6 is a transverse section of a spud and its attaching bracket and looking in the direction of the arrow, Fig. 5.

Referring to the drawing, the numeral 1 denotes the metal rim or felloe of a wheel such as is usually fitted to agricultural implements, tractors and the like.

Spuds 3, 3 are detachably secured to the spokes 2 of the wheel, each spoke carrying a pair of spuds.

Each of the spuds 3 is attached to its appropriate spoke by means of a bracket adapted to be clamped to the spoke. Figs. 3 and 3ª show the members of a pair of these brackets. Referring to these figures, 4 is the bracket carrying one of a pair of spuds and 4ª is the bracket carrying the other of the pair. Each of the said brackets has a lateral extension 5 formed at or near one of its ends and a semicircular recess 6 in its inner face at or near the centre of its length. A hole 7 is drilled through each of the lateral extensions. One of each pair of brackets, say 4ª, has a tongue or catch 8 formed at its end remote from the lateral extension, and the other of the pair of brackets, 4, is provided with an opening 8ª into which the said tongue or catch can be fitted. At the end of the bracket 4 remote from its lateral extension a hole 9 is provided and in the bracket 4ª a hole 9ª is formed to register with the hole 9. A bolt 10 can then be passed through the two brackets when the tongue 8 is engaged in the opening in the bracket 4.

The spuds 3 are made separate from the brackets and have wedge-shaped, ground-engaging portions and plane tops to rest on the under sides of the lateral extensions 5 of the brackets. Projecting from the plane top of each spud is a pin 11 which is adapted to be passed through the corresponding hole 7 in the bracket, a cotter pin 12 being passed through the projecting pin 11 in order to secure the spud in position on the bracket.

A pair of spuds and brackets assembled on a spoke of the wheel is shown in Figs. 4 and 5. It will be seen that the two semi-circular recesses 6 fit around said spoke. The tongue 8 of the bracket 4ª is engaged in the hole 8ª in the bracket 4 and the bolt 10 passed through the holes 9 and 9ª and screwed up. The spud arrangement can then be secured in any position on the spoke.

The top portion of each spud is provided with a recess 13, as shown in Fig. 6 which recess is adapted to engage and interlock with the edge of the rim 1 as shown at Figs. 4 and 5 and at the right hand side of Fig. 2.

To assemble the spuds on the spokes for traveling over firm ground, a pair of brackets such as 4 and 4ª (Figs. 3 and 3ª) with their associated spuds is clamped to each spoke of the wheel as above described, the ground engaging portions of the spuds being located below the rim of the wheel, as shown in the left hand half of Fig. 1. It will be seen that a single bolt is sufficient for clamping each pair of studs.

For use on soft or loose ground, the bolt 10 is slackened, and the two brackets and spuds turned about the spoke into a position somewhat as shown by the broken lines in Fig. 4. The brackets are slid outwards along the spoke till they contact with the inside of the rim (for which reason the brackets are preferably given a curvature the same as the wheel). The whole is then turned in the opposite direction in order to bring the spuds against the edges of the rim which engages (at opposite sides thereof) with the recesses 13 of the spuds, whereupon the bolt 10 is tightened up and the whole device rigidly held in place. The fact that each spud is in contact along a flat surface with the edge of the rim prevents the spud carrying pins 11 turning in their holes 7. The implement is then ready for use on soft or loose surfaces.

When the spuds are in the operative position, they extend beyond the rim at each side thereof, thus giving a broad tread. If desired the spuds may be made to extend across the rim and they may be angled if required.

From the foregoing description it will be appreciated that the invention provides a very useful and convenient form of movable spud, which is simple in construction and effective in operation, and obviates the necessity for making holes in the rim of the wheel and also for entirely removing the spuds from the wheel when travelling over firm ground, so that the spuds are always ready when wanted.

It will be noted that the load on the spuds is not transmitted to the brackets or clamping arrangements but is transmitted to the rim of the wheel through the shoulders and recesses of the spuds, and hence there is no tendency for the brackets to slide inwardly along the spokes.

The spuds are subject to heavy wear, and by making them separate from the brackets, they can be readily removed and replaced, if required. The spuds and brackets may, however, be made in one. Further, if desired, the brackets may readily be made for attachment to the spokes singly instead of in pairs, but it is noteworthy that when the spuds are arranged in pairs as described, extending in opposite directions from the edge of the wheel rim, the effective area of spud presented to the ground is increased without any increase in the size of individual spuds.

The provision of the tongue on one bracket of a pair makes it only necessary to tighten up and slacken one bolt in adjusting the pair of spuds.

The rims of wheels having spokes angularly set instead of being truly radial, may be fitted with pins which extend radially inwards and the brackets of the spuds can be clamped thereto in the same manner as to the spokes. This arrangement may also be adopted when spuds require to be fitted in positions intermediate the spokes, or in some cases where the wheels are not provided with spokes.

Having now fully described my invention, what I claim and desire to secure by Letters Patent is:—

1. A spud arrangement for wheels, comprising means enabling the spuds to be secured in inoperative positions within the periphery of the wheel rim and also permitting radial and turning movements of the spuds into operative positions, in which they protrude beyond the periphery of the wheel rim and at opposite sides thereof.

2. A spud arrangement for wheels comprising, in combination, spuds, means for carrying said spuds and for permitting radial and turning movements of the spuds from inoperative positions within the periphery of the wheel rim into operative positions in which they protrude beyond the periphery of the wheel rim, means for clamping said spud-carrying means to the wheel so that the spuds can occupy inoperative or operative positions and means for interlocking the protruding spuds with, and on opposite sides of, the wheel rim.

3. A spud arrangement for wheels comprising, in combination, spuds, bracket means for carrying said spuds and for permitting radial and turning movements thereof from inoperative positions within the periphery of the wheel rim into operative positions in which the spuds protrude beyond the periphery of the wheel rim, a single fastening means for clamping the bracket means to the wheel so that the spuds can occupy inoperative or operative positions and means for interlocking the protruding spuds with, and on opposite sides of, the wheel rim.

4. A spud arrangement for wheels comprising, in combination, spuds, means for securing the spuds in inoperative positions within the periphery of the wheel rim and for permitting radial and turning movements of the spuds into operative positions in which they protrude beyond the periphery of the wheel rim, and recesses in the spuds whereby the latter can be interlocked, when in their protruding positions with, and on opposite sides of, the wheel rim.

5. A spud arrangement for wheels comprising, in combination, spuds, means for carrying said spuds and for permitting radial and turning movements of the spuds from inoperative positions within the periphery of the wheel rim into operative positions in which they protrude beyond the periphery of the wheel rim, means for clamping said spud-carrying means to the wheel so that the spuds can occupy inoperative or operative positions, and recesses in the spuds whereby the latter can be interlocked, when in their protruding positions with, and on opposite sides of, the wheel rim.

6. A spud arrangement for wheels comprising, in combination, a pair of spuds, bracket means for carrying each spud and for permitting radial and turning movement thereof from an inoperative position within the wheel rim into its operative position in which it protrudes beyond the periphery of the wheel rim, means for clamping said brackets on to a spoke of the wheel, and means for interlocking said spuds in their protruding positions with, and one on each side of, the wheel rim.

7. A spud arrangement for wheels comprising, in combination, a pair of spuds, a bracket for carrying each spud and for permitting radial and turning movements of said spud from its inoperative position within the periphery of the wheel rim into its operative position protruding beyond the periphery of the wheel rim, co-acting means on said brackets whereby the latter can be firmly clamped on to a spoke of the wheel by a single fastening means, and means on said spuds whereby they can be interlocked in their protruding positions with, and one on each side of, the wheel rim.

8. A spud arrangement for wheels comprising, in combination, a pair of spuds, a bracket for carrying each spud, means on each bracket for engaging with a spoke of the wheel and for permitting radial and turning movements of the spud from its inoperative position within the periphery of the wheel rim into its operative position protruding beyond the periphery of the wheel rim, co-acting means on said brackets whereby the latter can be firmly clamped to said spoke by a single fastening means, and recesses in said spuds whereby they can be interlocked in their protruding positions with, and one on each side of, the wheel rim.

9. A spud arrangement for wheels comprising, in combination, a pair of spuds, a pair of brackets, a lateral extension on each bracket, means for securing a spud to said extension, means on each bracket for engaging with a spoke of the wheel and permitting radial and turning movements of the spud from its inoperative position within the periphery of the wheel rim into its operative position in which it protrudes beyond the periphery of the wheel rim, co-acting means on said brackets whereby the latter can be firmly clamped to said spoke by a single fastening means, and recesses in said spuds whereby they can be interlocked in their protruding positions with, and one on each side of, the wheel rim.

10. A spud arrangement for wheels comprising, in combination, a pair of spuds, a pair of brackets, a lateral extension on each bracket, means for securing a spud to said extension, a recess in each bracket for engaging with a spoke of the wheel and for permitting sliding and turning movements of said bracket along and around said spoke so that the spuds can be moved into their operative positions in which they protrude beyond the periphery of the wheel rim, co-acting means on said brackets whereby the brackets can be firmly clamped on to said spoke by a single fastening means, and recesses in said spuds whereby they can be interlocked in their protruding positions with, and one on each side of, the wheel rim.

11. A wheel comprising, in combination, an imperforate rim, spokes, and a plurality of spud arrangements each comprising a pair of spuds, a bracket for carrying each spud, means on each bracket for engaging with a spoke of the wheel and permitting radial and turning movements of said bracket along and around said spoke so that the spuds can be moved into their operative positions in which they protrude beyond the periphery of the wheel rim, co-acting means on said brackets whereby the latter can be firmly clamped on to said spoke by a single fastening means, and recesses in said spuds whereby they can be interlocked in their protruding positions with, and one on each side of, the wheel rim.

In testimony whereof I affix my signature.

WILLIAM BURNS WALLACE.